Patented Aug. 23, 1932

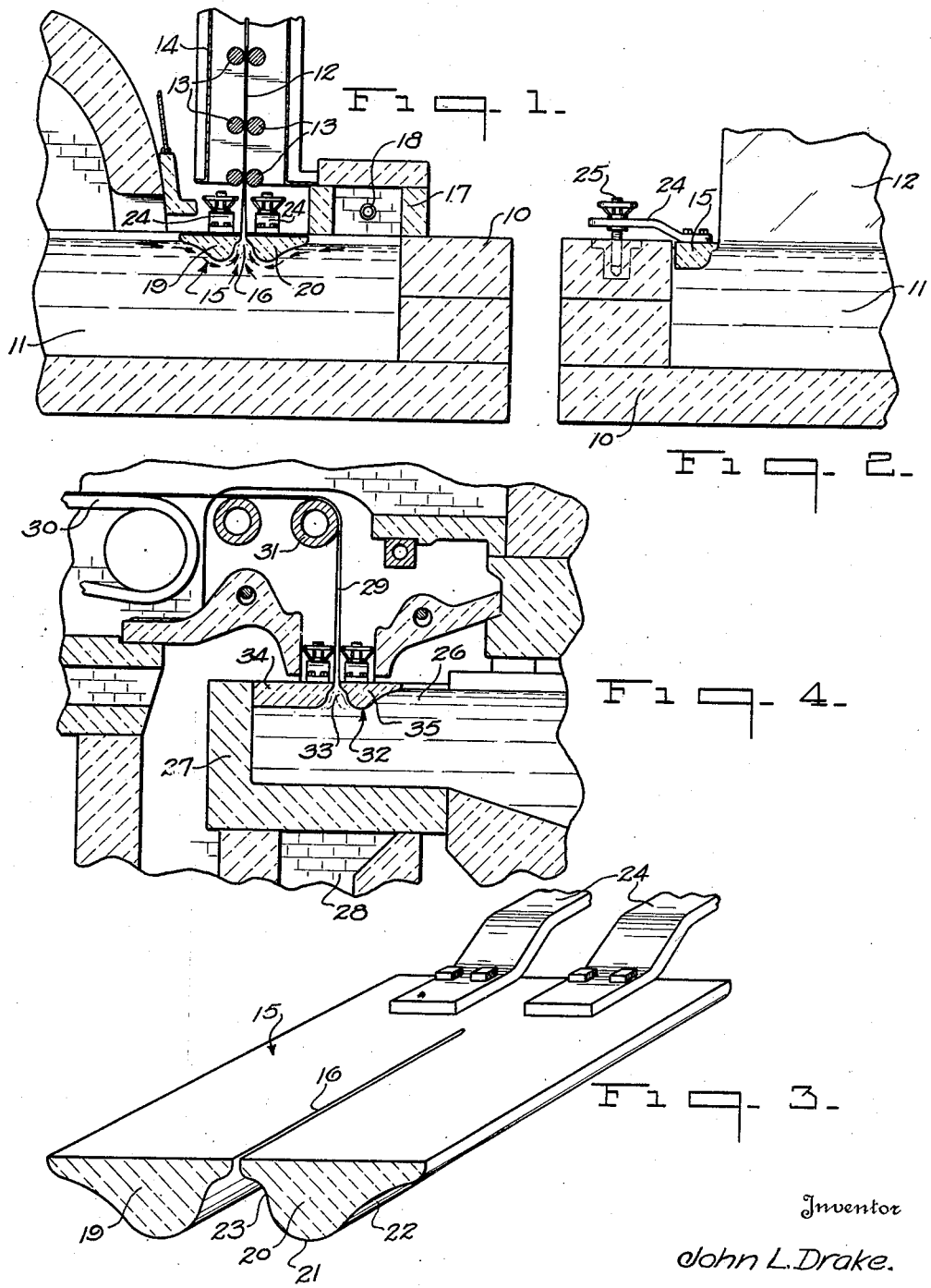

1,872,696

UNITED STATES PATENT OFFICE

JOHN L. DRAKE, OF TOLEDO, OHIO, ASSSIGNOR TO LIBBEY-OWENS-FORD GLASS COMPANY, OF TOLEDO, OHIO, A CORPORATION OF OHIO

SHEET GLASS APPARATUS

Application filed September 24, 1927. Serial No. 221,813.

The present invention relates broadly to sheet glass apparatus and more particularly to an improved sheet forming member.

An important object of the invention is to provide in sheet glass apparatus including a source of molten glass, a sheet forming member associated with said source and being of such a construction that the tendency toward the formation of devitrified glass will be reduced to a minimum.

Another object of the invention is to provide in sheet glass drawing apparatus including a source of molten glass and means for drawing a sheet of glass therefrom, a sheet forming member or deputer disposed in said source and being formed in a manner to practically eliminate the stagnation of that molten glass surrounding said member in close proximity thereto.

A further object is to provide in sheet glass drawing apparatus including a source of molten glass and means for drawing a sheet therefrom, a deputer arranged in the source of molten glass, said deputer having a sheet forming slot therein and being constructed in such a manner as to reduce to a minimum the resistance offered thereby to the molten glass flowing to said sheet forming slot.

A still further object is to provide in sheet glass drawing apparatus including a source of molten glass and means for drawing a sheet therefrom, a deputer arranged in the source of molten glass and having a sheet forming slot therein, the undersurface of said deputer being curved to substantially conform to the current of glass flowing to the sheet forming slot.

Other objects and advantages of the invention will become more apparent during the course of the following description when taken in connection with the accompanying drawing.

In the drawing forming a part of this application and wherein like numerals are employed to designate like parts throughout the same.

Fig. 1 is a fragmentary longitudinal vertical section through one form of sheet glass drawing apparatus showing the present invention in use.

Fig. 2 is a transverse vertical section therethrough.

Fig. 3 is a fragmentary perspective view of a sheet forming member or deputer constructed in accordance with the present invention, and Fig. 4 is a fragmentary longitudinal vertical section through another form of sheet glass drawing apparatus in connection with which the present invention may be used.

Referring first to Figs. 1 to 3 inclusive of the accompanying drawing, wherein for the purpose of illustration is shown a preferred embodiment of the present invention, the numeral 10 designates a draw pot or working receptacle containing a source of molten glass 11 from which a sheet of glass 12 may be drawn upwardly by means of a plurality of pairs of rolls 13, the sheet being passed vertically through an annealing chamber 14. To facilitate the continuous drawing of the sheet 12 from the source of molten glass 11, a sheet forming member or deputer 15 is disposed therein, said member being provided with a slot 16 within which is adapted to be created, under hydrostatic pressure, a sheet source from which the sheet 12 may be drawn.

Heretofore, in sheet glass drawing apparatus similar to the type above described, the sheet forming member or deputer has consisted ordinarily of an elongated refractory block substantially rectangular in cross section and having a longitudinally extending slot therein. Considerable difficulty has been experienced with this type of deputer, however, due to the formation of devitrified glass or dog-metal in proximity thereto, the formation of this dog-metal being largely caused by the fact that the surface glass adjacent the deputer is practically stagnant due to the resistance offered to the flow thereof by the straight side walls of the deputer which prevent the glass from being drawn into the slot. This stagnation of the surface glass surrounding the deputer induces the speedy devitrification of the glass and the resultant dog-metal coming into contact with the glass forming the sheet is very apt to cause lines and other defects therein. Also, portions of this dog-metal sometimes find their way into the sheet causing defects therein. Furthermore, the molten glass has a tendency to wear away the straight side walls of the usual refractory deputer as it flows into the slot with the result that stones are apt to be drawn upwardly into the finished product. After a certain amount of dog-metal has formed, it becomes necessary to stop the machine and remove this devitrified glass and in some types of machines, this formation is comparatively rapid, thus necessitating frequent shutting down of the machines with a consequent loss in efficiency and production.

It is an aim of the present invention to minimize the formation of dog-metal around the sheet forming member or deputer by eliminating stagnation of the surface glass. This is preferably accomplished by constructing the deputer 15 in a manner to present a minimum resistance to the flow of glass thereto, and also to gradually deflect said flow into the sheet forming slot 16.

As best shown in Fig. 3, the deputer 15 preferably consists of a single elongated slotted member which may be formed either of a suitable refractory material or of a non-corrosive metal as desired. The longitudinally extending slot 16 terminates inwardly of the opposite ends of the member and divides or separates the same into a pair of side portions 19 and 20. The undersurface of each side portion 19 and 20 is rounded at its thickest point, which is substantially at its transverse center, as at 21, the said surface curving upwardly and outwardly toward the outer longitudinal edge of the deputer as at 22 and upwardly and inwardly to the slot 16 as at 23.

Thus, the undersurface of the deputer consists of a series of gradual curves extending from the longitudinal edges thereof to the slot, the undersurface being curved in a manner to conform as near as possible, to the natural current of molten glass flowing into the slot 16 as indicated by the arrows in Fig. 1, so that a minimum resistance will be offered thereto. The glass flowing into the slot in the deputer will consist of both surface and sub-surface glass, the result being that there will be very little tendency toward the formation of devitrified glass since the surface glass is continuously kept in motion to avoid any stagnation thereof. The deputer may be maintained in position by securing to each end thereof a bracket arm 24 having connection with the means 25 carried by draw pot 10 and by means of which the said deputer can also be raised and lowered within the bath of molten glass.

The working receptacle 10 may be provided at its forward end with a chamber 17 adapted to be heated by means of one or a plurality of burners 18 which serve to maintain the glass at this side of the deputer at the desired temperature, the glass at the opposite side being heated by gases from the furnace.

In Fig. 4 is shown a slightly modified form of the present invention, the source of molten glass 26 being contained within a draw pot 27 supported above a heating chamber 28. The sheet 29 is adapted to be drawn upwardly from the molten source by means of the drawing mechanism 30 and deflected into the horizontal over a bending member or roll 31. The sheet forming member or deputer is designated in its entirety by the numeral 32 having a slot 33 therein which divides the same into the side portions 34 and 35. This deputer is to a slightly different form than that shown in Fig. 3 in that while the undersurface of the portion 35 is curved in the same manner, the portion 34 extends over to and abuts against the forward end wall of the draw pot 27 so as to maintain the glass therebeneath in a heated state to prevent devitrification thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A deputer for use in sheet glass drawing apparatus and adapted to be positioned within a mass of molten glass, comprising a substantially rectangular member of greater width than depth and having a longitudinally extending slot therein approximately intermediate its longitudinal edges, said member having a stream line bottom curving upwardly and then outwardly to its longitudinal edges and upwardly and then inwardly to the slot.

2. A deputer for use in sheet glass drawing apparatus and adapted to be positioned within a mass of molten glass, comprising a substantially rectangular member of greater width than depth and having a longitudinally extending slot therein approximately intermediate its longitudinal edges, said member having a stream line bottom curving upwardly and then outwardly to its longitudinal edges and upwardly and then inwardly to the slot, the longitudinal edges of the member and the edges of the slot being in substantial horizontal alignment when said member is disposed in operative position within the molten glass.

3. A deputer for use in sheet glass drawing apparatus and adapted to be positioned within a mass of molten glass, comprising a substantially rectangular member of greater width than depth and having a longitudinally extending slot therein approximately intermediate its longitudinal edges to provide spaced side portions, each side portion dipping deeper into the molten glass at substantially its transverse center and having a stream line bottom formed of a double reverse curve.

4. A deputer for use in sheet glass drawing apparatus and adapted to be positioned within a mass of molten glass, comprising a substantially rectangular member of greater width than depth and having a longitudinally extending slot therein approximately intermediate its longitudinal edges to provide spaced side portions, each side portion dipping deeper into the molten glass at substantially its transverse center and curving upwardly and then outwardly to its longitudinal edge and upwardly and then inwardly to the slot in a double reverse curve, with the longitudinal edges of the member and the edges of the slot being in substantial horizontal alignment when said member is disposed in operative position.

5. A deputer for use in sheet glass drawing apparatus and adapted to be positioned within a mass of molten glass, comprising a substantially rectangular member of greater width than depth and having a longitudinally extending slot therein approximately intermediate its longitudinal edges, said member having a stream line bottom curving upwardly and then outwardly to its longitudinal edges and upwardly and then inwardly to the slot, the upper longitudinal edges of the member and the edges of the slot being in substantial horizontal alignment and disposed above the surface of the molten mass of glass when said member is disposed in operative position.

6. A deputer for use in sheet glass drawing apparatus and adapted to be positioned within a mass of molten glass, comprising a substantially rectangular member of greater width than depth and having a longitudinally extending slot therein approximately intermediate its longitudinal edges to provide spaced side portions, one of said side portions dipping deeper into the molten glass at substantially its transverse center and having a stream line bottom formed of a double reverse curve.

7. A deputer for use in sheet glass drawing apparatus and adapted to be positioned within a mass of molten glass, comprising a substantially rectangular member of greater width than depth and having a longitudinally extending slot therein approximately intermediate its longitudinal edges to provide spaced side portions, one of said side portions dipping deeper into the molten glass at substantially its transverse center and curving upwardly and then outwardly to its longitudinal edge and upwardly and then inwardly to the slot in a double reverse curve, with the longitudinal edges of the member and the edges of the slot being in substantial horizontal alignment when said member is disposed in operative position.

Signed at Toledo, in the county of Lucas and State of Ohio, this 22d day of September, 1927.

JOHN L. DRAKE.